(12) United States Patent
Ohara et al.

(10) Patent No.: US 7,701,519 B2
(45) Date of Patent: Apr. 20, 2010

(54) DISPLAY SYSTEM AND SIGNAL PROCESSING USING DIAMOND-SHAPED DMDS

(75) Inventors: Kazuhiro Ohara, McKinney, TX (US); Terry Bartlett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/866,880

(22) Filed: Oct. 3, 2007

(65) Prior Publication Data

US 2008/0024677 A1      Jan. 31, 2008

Related U.S. Application Data

(62) Division of application No. 10/465,001, filed on Jun. 19, 2003, now Pat. No. 7,397,517.

(51) Int. Cl.
*H04N 5/46*      (2006.01)

(52) U.S. Cl. ...................................... 348/771

(58) Field of Classification Search .......... 348/771.764, 348/744, 745, 759–761, 607, 611, 572
See application file for complete search history.

(56) References Cited

U.S. PATENT DOCUMENTS

| | | | | |
|---|---|---|---|---|
| 3,571,494 A | * | 3/1971 | Law | 348/426.1 |
| 4,015,286 A | * | 3/1977 | Russell | 386/40 |
| 5,402,184 A | * | 3/1995 | O'Grady et al. | 348/764 |
| 5,657,099 A | * | 8/1997 | Doherty et al. | 348/743 |
| 5,726,718 A | * | 3/1998 | Doherty et al. | 348/771 |
| 5,754,217 A | * | 5/1998 | Allen | 347/239 |
| 6,843,570 B2 | * | 1/2005 | Shin | 353/99 |

* cited by examiner

*Primary Examiner*—Paulos M Natnael
(74) *Attorney, Agent, or Firm*—Charles A. Brill; Wade James Brady, III; Frederick J. Telecky, Jr.

(57) ABSTRACT

An imaging system 10 includes an image source providing an image having a resolution of X by Y pixels. The system also includes a digital mirror device 16 that includes an array of mirror elements. Each mirror element includes an edge that is not parallel to an edge of a neighboring mirror element. The array 16 includes fewer than X*Y mirror elements.

13 Claims, 8 Drawing Sheets

NEW PIXEL = (4x+A+B+C+D)/8

3x3
FOURIER
TRANSFORM

5x5
FOURIER
TRANSFORM

7x7
FOURIER
TRANSFORM

DISPLAY SYSTEM AND SIGNAL PROCESSING USING DIAMOND-SHAPED DMDS

TECHNICAL FIELD

The present invention relates generally to a system and method for visual displays, and more particularly the preferred embodiment relates to a display system and signal processing using diamond-shaped DMDs.

BACKGROUND

Display systems, such as televisions, display full-motion video images as a series of still frames. Each frame of the image is comprised of a two-dimensional array of picture elements, known as pixels, arranged in orthogonal rows and columns. The image information is transmitted in a raster-scan format, one line at a time from top to bottom. Within each line the pixel information is transmitted from left to right.

In some embodiments of television systems, no cathode ray tube (CRT) is used. These televisions use arrays of individually controllable elements, such as liquid crystal devices (LCDs), or digital micromirror devices (DMDs). Because there is no scanning gun in these systems, they will put the entire frame onto the activation circuitry for the array of individual elements.

Standard television systems in the United States have 480 rows with a resolution of approximately 572 pixels in each row. Video Graphic Adapter (VGA) standards specify an image comprised of 480 rows of 640 pixels and Extended Graphic Adapter (XGA) standards specify an image comprised of 1024 rows of 768 pixels.

Recent standards have been developed for high-definition television (HDTV). For example, an HDTV signal can carry 1,080 rows of 1,920 pixels at 24, 30 and 60 Hz refresh rate progressive video with 720 rows of 1,280 pixels with refresh rates at 24, 30 and 60 Hz. The higher resolution, interlaced format presents 2,073,600 individual pixels for each frame, and the lower resolution, progressive format presents 921,600 individual pixels. There are plans to update HDTV using progressive scan technology combined with the 1,080 by 1,920.

SUMMARY OF THE INVENTION

In one aspect, the present invention relates to high definition display systems, such as televisions for consumer use. One goal in this market is to produce a low cost device in high volume. The preferred embodiment provides such a display system by utilizing a diamond-shaped digital micromirror device (DMD). Using this device, for example the number of mirrors can be reduced to half those needed to present a full-resolution picture without significantly degrading visual quality.

In accordance a preferred embodiment of the present invention, an imaging system includes an image source providing an image having a resolution of X by Y pixels. The system also includes a digital mirror device that includes an array of mirror elements. Each mirror element includes an edge that is not parallel to an edge of a neighboring mirror element. The array includes fewer than X*Y mirror elements.

The present invention also includes a method of processing image data. An analog video signal carries image data in the form of a number of frames. Each frame includes a number of lines and each line includes a number of pixels. The analog video signal is repeatedly sampled at a sampling point. This sampling point shifts for every other line of image data. For example, the sampling point may shift an amount equal to about half the sampling period.

In another embodiment, a digital video signal carries image data in the form of a plurality of frames. Once again, each frame includes a number of lines and each line includes a number of pixels. The digital video signal is filtered to generate a filtered video signal. The filtered video signal carries the image data in the form of a plurality of frames but now each frame includes a number of pixels fewer than the product of the number of lines by the number of pixels per line in the digital video signal. This digital video signal can be provided to a spatial light modulator. For example, the spatial light modulator (e.g., a DMD) can have a number of individually controllable elements equal to the number of pixels included in each frame of the filtered video signal.

An advantage of a preferred embodiment of the present invention is that a significant cost reduction (less than conventional orthogonal DMD) can be achieved. This cost reduction requires only minimal additional signal processing.

Various embodiments of the present invention can also provide different diamond-shaped DMDs for higher resolution sources such as future HDTV formats including 3840H×2048V or 7680H×4096V. In the preferred embodiment, the diamond-shaped DMD allows just half the pixels of the source horizontal pixel resolution.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a video display system based on DMD technology. The invention may also be applied, however, to other contexts. For example, images can be displayed other than the television signal example cited herein. In addition, display technologies other than those based on DMDs can utilize concepts of the present invention.

Figure 1:
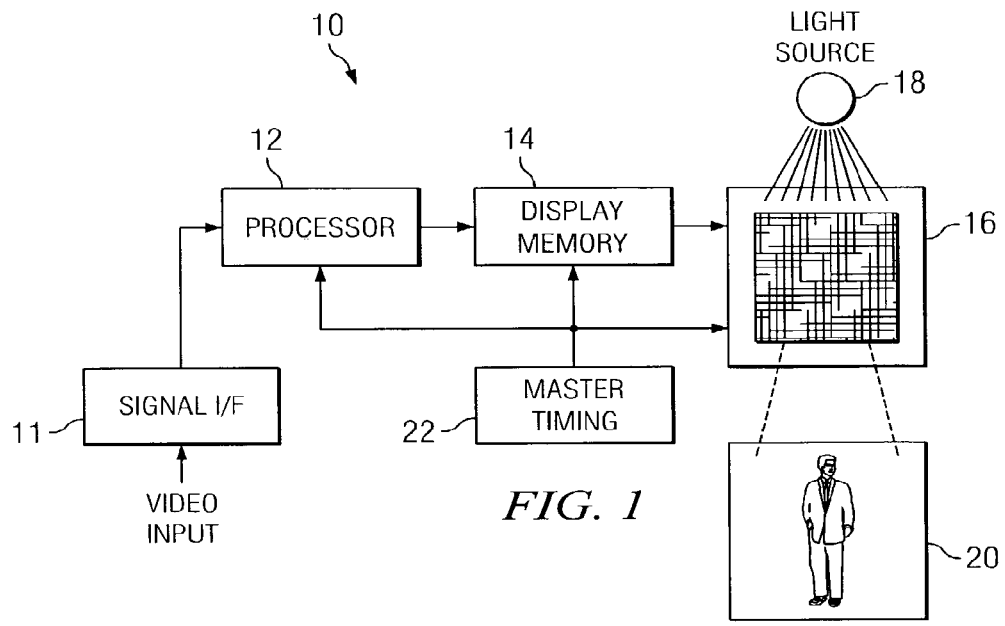
FIG. 1 is a simplified block diagram of an embodiment system of the present invention.

A television receiver 10 that converts from the current standard of analog television transmission to digital signals is shown in FIG. 1. The requirement of analog to digital (A/D) conversion is not a necessary for the operation of the invention. In some manner, however, a digital signal will be produced. The incoming video signal comes into the receiver at signal interface (I/F) 11. At this point, if the incoming signal is not already in digital form, it is digitized by A/D conversion.

The incoming signal will undergo various processing. For example, color space conversion and interlace-to-progressive scan conversion can be performed on the chrominance and luminance (C and Y) components of the analog signal, or on the red-green-blue (RGB) converted signal. This processing can occur either in the signal interface unit 11 or, more preferably, the processor 12 of receiver 10 in FIG. 1.

The converted signal, after undergoing any other processing that may be desired, is sent to a display memory 14. The master timing unit 22 controls the timing of the signals between the processor 12 and the memory 14 and between the memory 14 and the spatial light modulator 16.

Spatial light modulator 16 is formed from an x-y array of individually controllable elements. Each element has some type of activation circuitry that causes the individual element to affect the light from light source 18 in response to a signal stored in memory 14. The cumulative effect of each array of elements responding to signals transmitted from the memory forms an image, which, after undergoing magnification would appear like image 20. In one aspect, the present invention provides a novel spatial light modulator that can include fewer controllable elements than the number of pixels in the incoming signal.

Figure 2:
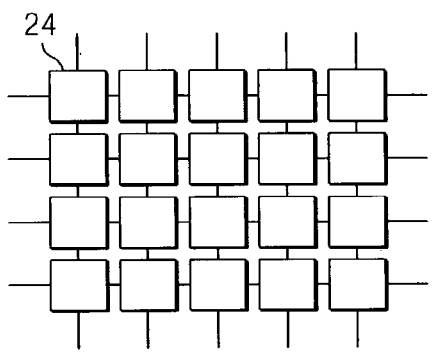
FIG. 2 shows the layout of a conventional array of individually controllable elements.

FIG. 2 shows a conventional array of individually controllable elements 24. For example, each of these elements can be a DMD element, such as described in U.S. Pat. Nos. 5,061,049 and 5,083,857, each of which is incorporated herein by reference. In use, each element will deform so that incoming light directed, or not directed, to image 20 depending upon the desired pattern. This pixel dependent transmission will occur at least once for each color (e.g., red, green, blue, white) during each frame.

Figure 3:
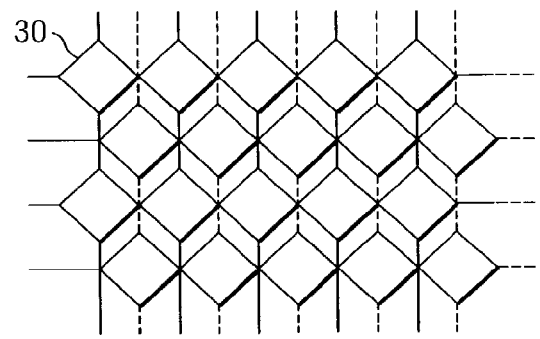
FIG. 3 shows the layout of an array of individually controllable elements in accordance with a preferred embodiment.

FIG. 3 shows an array of DMD elements according to a preferred embodiment of the present invention. In this embodiment, each of the elements 30 includes edges that are not parallel to edges of the elements 30 in the adjacent rows and/or columns and, therefore, can be considered diamond-shaped. In the illustrated embodiment, each element 30 is a square DMD that has been rotated 45°. In other embodiments, other shaped elements 30 can be utilized. Preferably, although not necessarily, each element 30 includes four edges. A typical mirror element will have a dimension of about 14 µm×14 µm.

One goal of this embodiment is to reduce the number of mirrors to be "half" with diamond mirror alignment. For example, if the orthogonal DMD array of FIG. 2 is used to display an image with 720×1280 pixel resolution, than that array would include 921,600 elements 24 (720×1280=921, 600). The diamond DMD of FIG. 3, on the other hand, could be implemented with only 460,800 elements 30 (921,600/2=460,800). These could be arranged in 640 columns and 720 rows (or 1280 columns and 360 rows). If the format was 1080×1920 than only 1,036,800 mirror elements (1080×1920÷2=1,036,800) would be necessary. In any of these cases, additional mirror elements can be included, e.g., for redundancy.

This embodiment could also be used with other standards. For example, an XGA display has a resolution of 1024×768. An array of 512 rows and 768 columns of elements 30 could effectively display an XGA image. With other standards, other size arrays are appropriate. In addition, if the array elements 30 are not square, then the number of elements could be reduced by a fraction different than 50%.

In the preferred embodiment, the diamond shaped DMD helps to increase yield and reduce costs. Further, this array will obtain comparable resolution to an orthogonal DMD with half of the elements.

Figure 4:
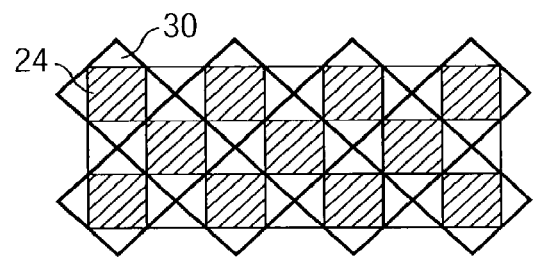
FIG. 4 illustrates the correspondence between diamond mirrors of a preferred embodiment and a conventional orthogonal array.

FIG. 4 shows diamond mirrors 30 overlying a conventional orthogonal array for purposes of illustration. In this example, each of the diamond-shaped elements 30 overlaps one entire square element and quarter-portions of four other square elements 24. It is noted that FIG. 4 was not designed to show the difference in physical relationship between the two arrays. Rather, this figure shows, for this embodiment, that only one pixel will now provide the information that was provided on two pixels previously. One aspect of the present invention provides techniques to derive the pixels signals so that they align with the pattern of the mirror array. These techniques will be discussed in further detail below.

Verification of the efficacy of this concept comes from the human eyes response. NTSC and Muse (NHK's first analog HDTV broadcasting system) standard are also defined with the human eyes response. Muse was defined based on human visual systems high sensitivity in the horizontal and vertical direction. The preferred embodiment of this invention maximizes the information content in the horizontal and vertical dimensions where the eye is most sensitive, at the expense of resolution in the diagonal where the eye response is less sensitive. Also, the image data is preprocessed to match the inherent spatial resolution of the diamond pixel DMD configuration.

Figure 5A:
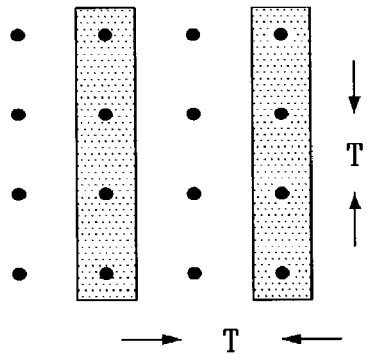
FIGS. 5a and 5b illustrate the relative resolutions of an orthogonal array and a diamond array.
Figure 5B:
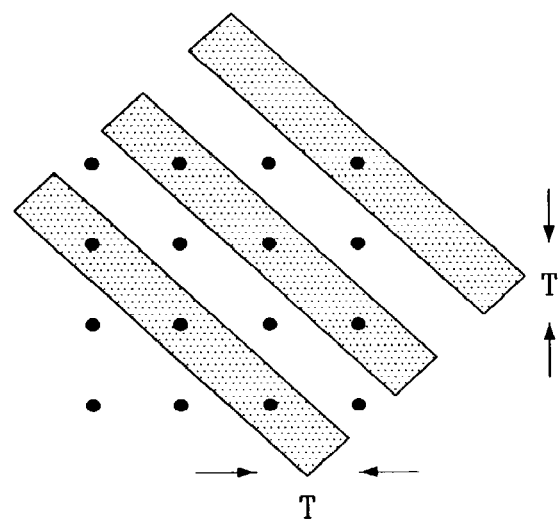

This concept can be seen with reference to FIGS. 5a and 5b. The conventional orthogonal pixel array has a higher resolution along diagonal as shown in FIG. 5a. In this case, the maximum resolvable horizontal frequency is $1/(2*T)$. In FIG. 5b, the array is rotated by 45 degrees to improve horizontal and vertical MTF (modulation transfer function).

Figure 6:
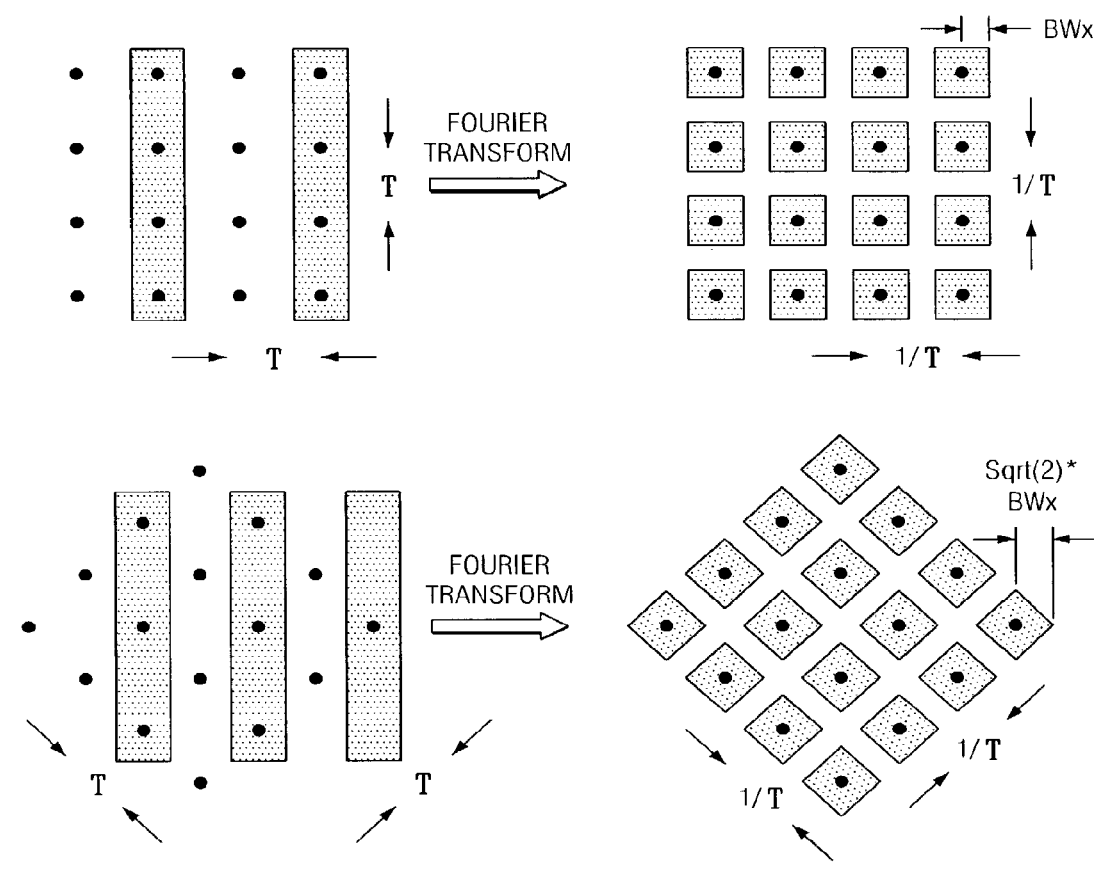
FIG. 6 shows the arrays of FIG. 5 after a Fourier transform is performed.

FIG. 6 shows both of these cases after Fourier Transform is performed. The sampling alignment is shown in right pictures in FIG. 6. In the sampled Fourier domain, instead of being replicated in an orthogonal orientation, the original spatial signal spectra are replicated in an offset (diamond) shape as shown in FIG. 6. This allows for a higher spatial frequency content in the horizontal and vertical directions at the expense of resolution in the diagonal directions.

Figure 7:
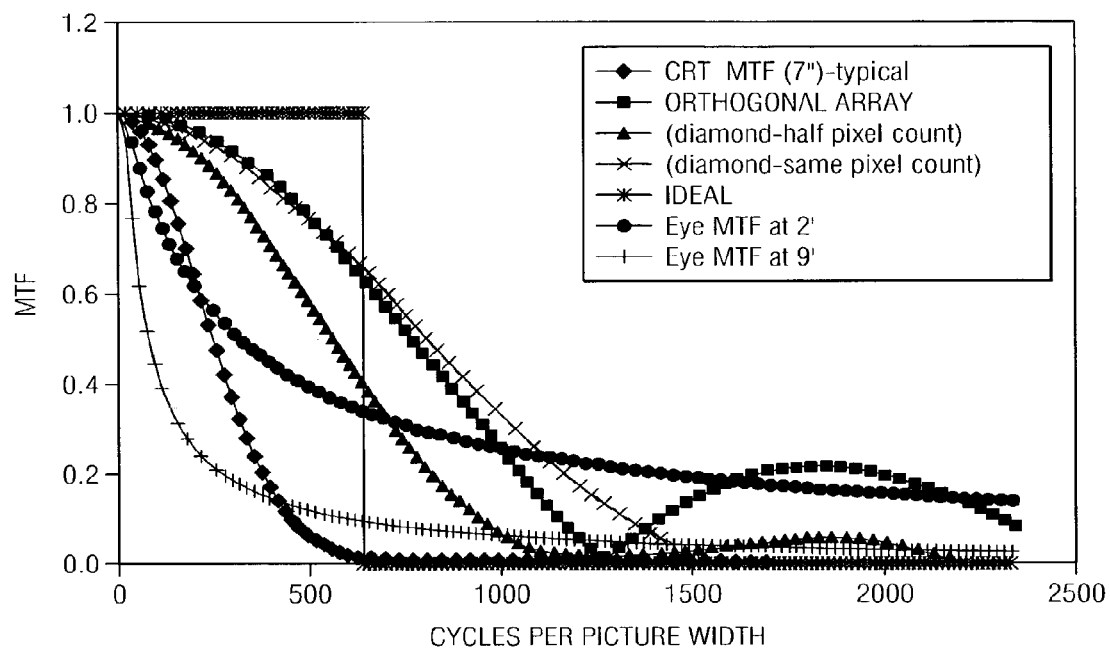
FIG. 7 shows an MTF comparison of several technologies.

FIG. 7 shows an MTF comparison of several technologies. In particular, this chart shows the MTF for a CRT, an orthogonal DMD array such as in FIG. 2, a diamond-shaped DMD array with the same number of mirror elements as the orthogonal DMD array and a diamond-shaped DMD array with half the number of mirror elements as the orthogonal DMD array. From the graph, it can be seen that the diamond array with half the pixel count has much better MTF compared with CRT. The MTF for this array is also reasonably degraded from the conventional orthogonal array, but it could reduce aliasing artifact at the out of pass band.

Figure 8:
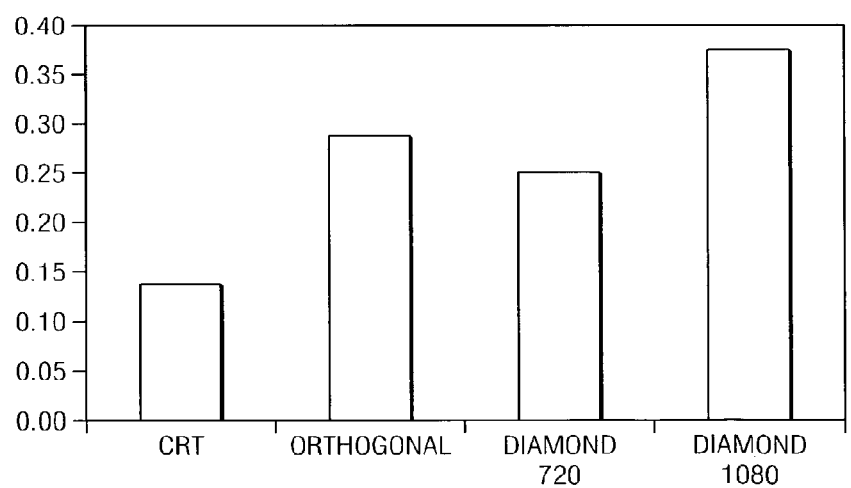
FIG. 8 shows an SQRI metric comparison of several technologies.

FIG. 8 provides a comparison of the four technologies using the SQRI metric from P. G. J. Barten. This metric shows excellent correlation with subjective image quality ratings using the equation $$J = \frac{1}{\ln(2)} \int_0^{u_{max}} \sqrt{\frac{MTF}{M_t}} \frac{du}{u}$$

and where the visual modulation threshold $M_t$ is defined as $$M_t(u) = \frac{1}{au \exp(-bu)\sqrt{1 + c \exp(bu)}}$$

Comparison of the results plotted in FIG. 8 show that the diamond-shaped array of FIG. 3 is close in performance to the conventional orthogonal array of FIG. 2, even though it includes only half of numbers of pixels.

Figure 9:
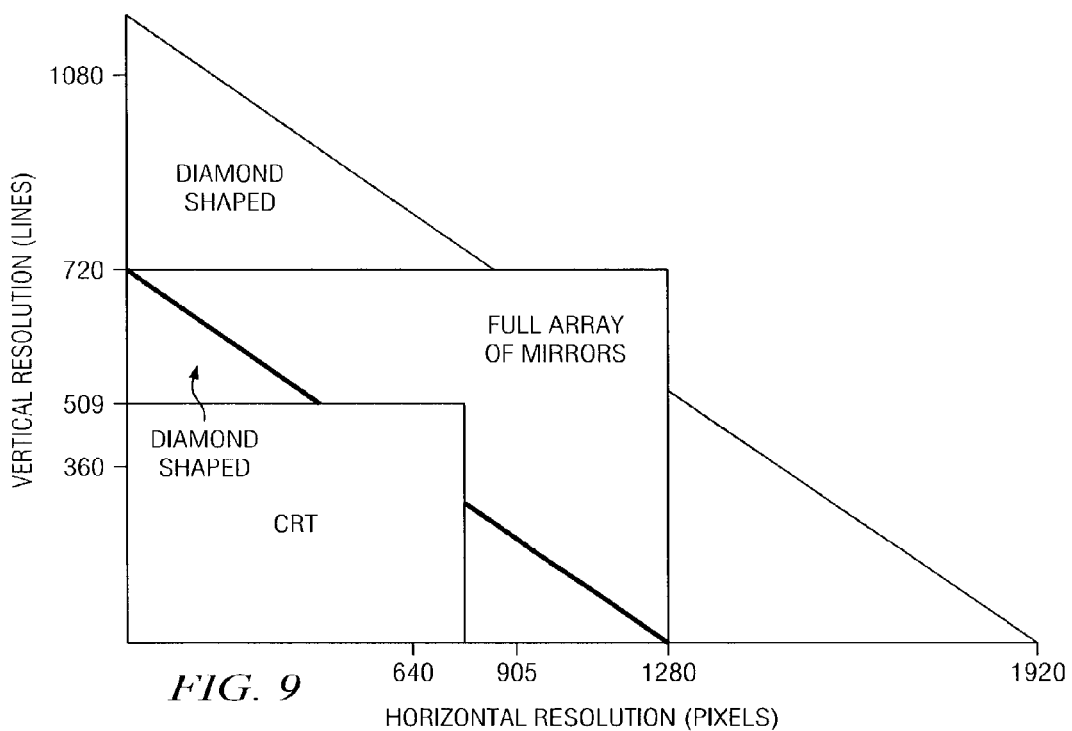
FIG. 9 shows frequency responses for several technologies.
Figure 10:
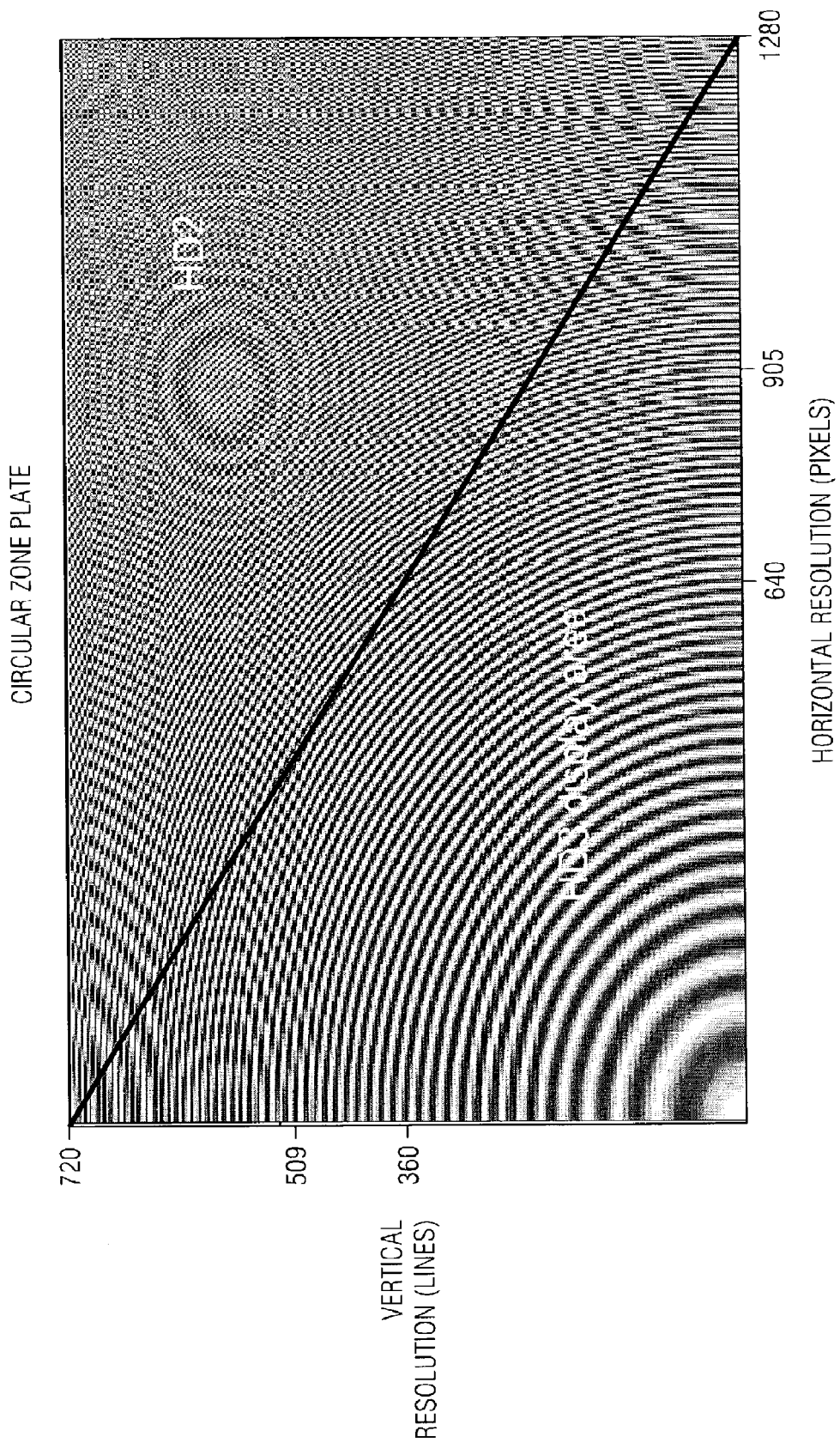
FIG. 10 shows the first quadrant of a circular zone plate.

FIG. 9 shows a plot that compares the frequency response for four technologies. FIG. 10 shows the first quadrant of a circular zone plate, corresponding to these frequency responses. In these plots, the x-axis shows the horizontal resolution (or frequency) and the y-axis shows the vertical resolution (or frequency). The CRT has the lowest resolution. As indicated by the diagonal lines, the diamond arrays with half the mirror elements only display images with resolutions in the bottom left portion of the plots. One aspect of the invention provides details on how to map the other portions into the displayable resolutions.

In order to realize diamond-shaped DMD, there are two kinds of signal processing that will be described here. These processing approaches are (1) offset sampling at the ADC for analog input signal and (2) the use of an interpolation/decimation filter for the diamond pixel alignment. Each of these will be described now.

Figure 11:
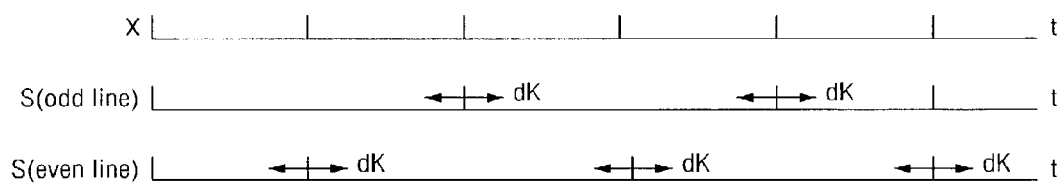
FIG. 11 illustrates the sampling points for one embodiment of the present invention.

In the case of offset sampling, the sampling point of the analog signal sampled at the analog-to-digital converter (ADC), e.g., within signal interface circuit 11 of FIG. 1, is doubled in period and shifted for every other line. The sampling point is found at the center of the previous line's data. This concept is illustrated in FIG. 11. In FIG. 11, the line labeled X indicates where sampling occurs for the orthogonal array (see elements 24 of FIG. 4). The lines labeled S (odd and even) indicate where sampling occurs for the diamond-shaped array. Comparing the lines labeled S with the diamond elements 30 of FIG. 4, it is can be seen that the center of each diamond element 30 is periodically spaced at an offset compared to adjacent lines. The dK notations in FIG. 11 indicate that the sampling point might vary with line jitter, e.g., caused by an unstable VCR or otherwise.

Figure 12:
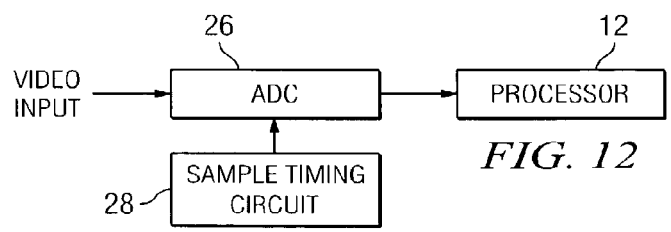
FIG. 12 shows a block diagram for a sampling circuit of the present invention.

FIG. 12 shows a simplified block diagram of the ADC 26 and timing circuit 28. As noted above, ADC 26 and timing circuit 28 can be included in interface circuitry 11 of FIG. 1. ADC 26 includes a sampling control input coupled to an output of timing circuit 28. The ADC takes a sample of the video input at a time based on the signal (e.g., a low-to-high transition or high-to-low transition) received from the timing circuit 28. A digital representation of the video input at this time is provided to processor 12. The sampling point S can be determined by the formula:

$$S = N \times Y/X + dK$$

where N is the number of samples (N=0 through (Y−1), Y is the DMD horizontal pixel number (e.g., 960), X is the input horizontal sampling number (e.g., 1920), and dK is the jitter component.

Using the sampling circuitry described here, the sample points can be converted from the orthogonal-array with square-shaped mirror elements to the diamond-array with diamond-shaped mirror elements. This technique can be used in conjunction with interpolation and filtering, as will be described next. Alternatively, the interpolation and filtering can be performed on a digital input stream that is identical to the one provided in the orthogonal-array system.

Figure 13:
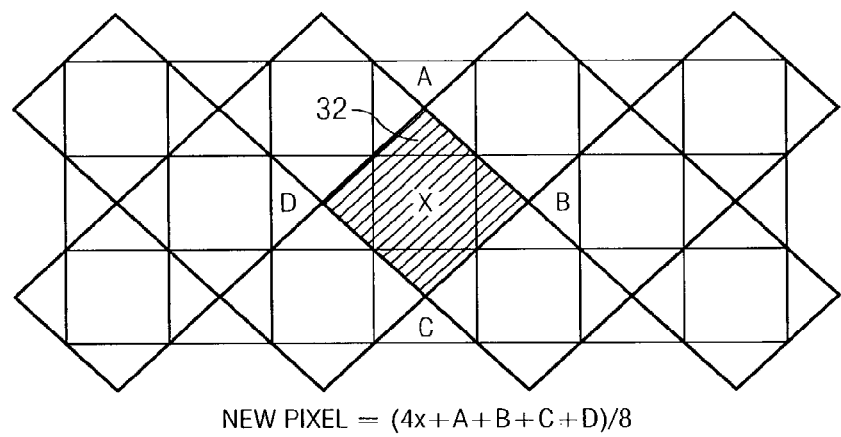
FIG. 13 shows a five-tap linear decimation filter.

If the input source is already digitized, then a filter for interpolation and/or decimation is used. This filter can be included within the processor 12 of FIG. 1, as an example. FIG. 13 shows a very simple five-tap linear decimation filter that will convert an input stream for the orthogonal array into an input stream for the diamond array. In this figure, one of the diamond pixels, labeled 32, is highlighted. As can be seen from the figure, the pixel 32 has components from five square elements, labeled A, B, C, D, and X. More specifically, the diamond-shaped element 32 includes all of element X and one quarter of elements A, B, C and D. As such, the value (e.g., a 256-bit code for a particular color R, G, B or W) corresponding to element 32 for a particular time can be calculated as $$\text{New\_Pixel} = \frac{(4X + A + B + C + D)}{8}.$$

In another notation, this formula can be denoted as $$\begin{bmatrix} & 1 & \\ 1 & 4 & 1 \\ & 1 & \end{bmatrix} \times \frac{1}{8}.$$

This formula relates the physical location of the various sample points that are being utilized.

Figure 14:
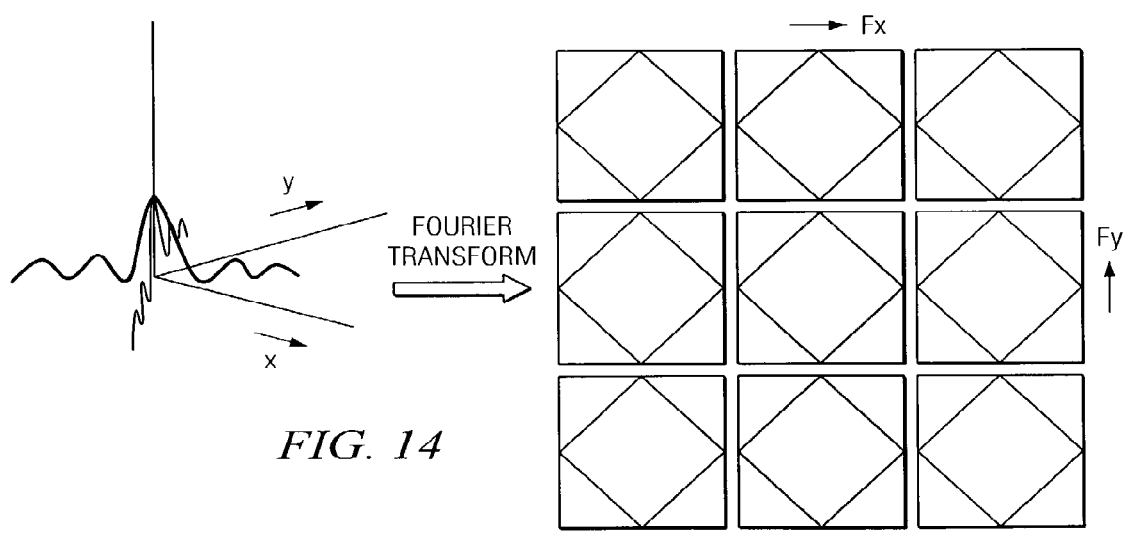
FIG. 14 illustrates an approach to pre-filtering.

FIG. 14 shows a more general approach to diamond pixel pre-filtering. The diamond pixel pre-filter is designed to filter the video data to reduce the bandwidth along the diagonal to best match the bandwidth of the diamond pixel DMD. The original data, which is sampled along horizontal and vertical dimensions, is convolved with a spatial filter that reduces the bandwidth in the diagonal dimension as shown in the figure. It is noted that the filter does not reduce the bandwidth in the horizontal and vertical dimensions where it is most needed.

Several filters have been generated based on filter design techniques to produce the desired diagonal spectrum as shown above. The results are shown below. In each of these examples, the ratio of the factors can vary up to 20% and still be within the formula. (Of course, the numbers could be uniformly scaled without any affect.)

$$3\times3 \text{ Filter:} \begin{bmatrix} 1 & 2 & 1 \\ 2 & 4 & 2 \\ 1 & 2 & 1 \end{bmatrix} \times \frac{1}{16}$$

$$3\times3 \text{ Filter:} \begin{bmatrix} -1 & 2 & -1 \\ 2 & 12 & 2 \\ -1 & 2 & -1 \end{bmatrix} \times \frac{1}{16}$$

$$5\times5 \text{ Filter:} \begin{bmatrix} 0 & -23 & 0 & -23 & 0 \\ -23 & 0 & 68 & 0 & -23 \\ 0 & 68 & 168 & 68 & 0 \\ -23 & 0 & 68 & 0 & -23 \\ 0 & -23 & 0 & -23 & 0 \end{bmatrix} \times \frac{1}{256}$$

$$7\times7 \text{ Filter:} \begin{bmatrix} 4 & 1 & -3 & 7 & -3 & 1 & 4 \\ 1 & -8 & -8 & 11 & -8 & -8 & 1 \\ -3 & -8 & 5 & 42 & 5 & -8 & -3 \\ 7 & 11 & 42 & 92 & 42 & 11 & 7 \\ -3 & -8 & 5 & 42 & 5 & -8 & -3 \\ 1 & -8 & -8 & 11 & -8 & -8 & 1 \\ 4 & 1 & -3 & 7 & -3 & 1 & 4 \end{bmatrix} \times \frac{1}{256}$$

Figure 15A:
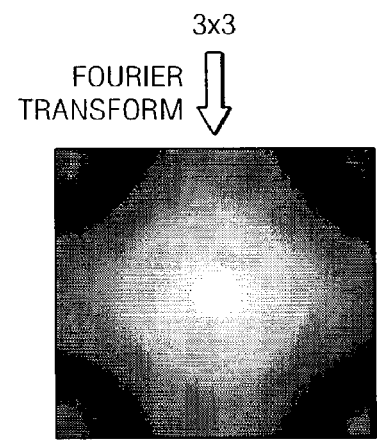
FIGS. 15a-15c provide the results of simulations using various size filters of the present invention.
Figure 15B:
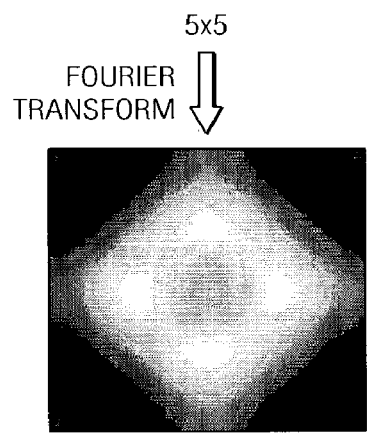
Figure 15C:
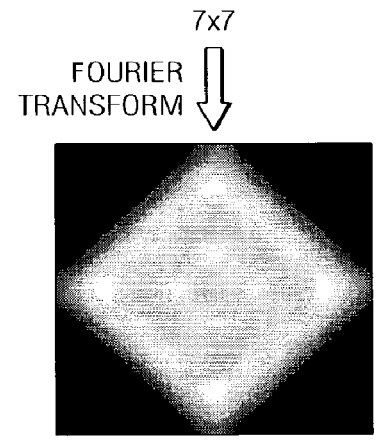

FIGS. 15a, 15b, and 15c show the results of a simulation of a 3×3 filter, a 5×5 filter and a 7×7 filter, respectively. As can be seen, the sharpness of the result increases as the filter gets larger. Give the design tradeoffs between processing power and image results, the 5×5 diamond pixel pre-filter showed excellent results having a small amount of high-frequency emphasis.

Although the present invention and its advantages have been described in detail, it should be understood that various changes, substitutions and alterations can be made herein without departing from the spirit and scope of the invention as defined by the appended claims. For example, the features and functions discussed above can be implemented in software, hardware, or firmware, or a combination thereof.

Moreover, the scope of the present application is not intended to be limited to the particular embodiments of the system, circuits, methods and steps described in the specification. As one of ordinary skill in the art will readily appreciate from the disclosure of the present invention, other processes and systems, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of processing image data, the method comprising:
   receiving a digital video signal, the digital video signal carrying image data in the form of a plurality of frames, each frame including a number of lines, each line including a number of pixels;
   filtering the digital video signal to generate a filtered video signal, the filtered video signal carrying image data in the form of a plurality of frames, each frame including a number of pixels fewer than the product of the number of lines by the number of pixels per line in the digital video signal; and
   providing the digital video signal to a spatial light modulator, the spatial light modulator having a plurality of individually controllable elements, the number of individually controllable elements being substantially equal to the number of pixels included in each frame of the filtered video signal.

2. The method of claim 1 wherein filtering the digital video signal comprises reducing the bandwidth of the digital video signal along a diagonal.

3. The method of claim 2 wherein filtering the digital video signal comprises convolving the image data with a spatial filter that reduces the bandwidth in a diagonal dimension.

4. The method of claim 3 wherein the filtering does not reduce the bandwidth in a horizontal or vertical dimension.

5. The method of claim 1 wherein filtering the digital video signal comprises applying the digital video signal to a 3*3 filter.

6. The method of claim 5 wherein the 3×3 filter has a characteristic defined by $$\begin{bmatrix} 1 & 2 & 1 \\ 2 & 4 & 2 \\ 1 & 2 & 1 \end{bmatrix} \times \frac{1}{16}.$$

7. The method of claim 5 wherein the 3×3 filter has a characteristic defined by $$\begin{bmatrix} -1 & 2 & -1 \\ 2 & 12 & 2 \\ -1 & 2 & -1 \end{bmatrix} \times \frac{1}{16}.$$

8. The method of claim 1 wherein filtering the digital video signal comprises applying the digital video signal to a 5*5 filter.

9. The method of claim 8 wherein the 5×5 filter has a characteristic defined by $$\begin{bmatrix} 0 & -23 & 0 & -23 & 0 \\ -23 & 0 & 68 & 0 & -23 \\ 0 & 68 & 168 & 68 & 0 \\ -23 & 0 & 68 & 0 & -23 \\ 0 & -23 & 0 & -23 & 0 \end{bmatrix} \times \frac{1}{256}.$$

10. The method of claim 1 wherein filtering the digital video signal comprises applying the digital video signal to a 7*7 filter.

11. The method of claim 10 wherein the 7×7 filter has a characteristic defined by $$\begin{bmatrix} 4 & 1 & -3 & 7 & -3 & 1 & 4 \\ 1 & -8 & -8 & 11 & -8 & -8 & 1 \\ -3 & -8 & 5 & 42 & 5 & -8 & -3 \\ 7 & 11 & 42 & 92 & 42 & 11 & 7 \\ -3 & -8 & 5 & 42 & 5 & -8 & -3 \\ 1 & -8 & -8 & 11 & -8 & -8 & 1 \\ 4 & 1 & -3 & 7 & -3 & 1 & 4 \end{bmatrix} \times \frac{1}{256}.$$

12. The method of claim 1 wherein providing the digital video signal to a spatial light modulator comprises providing the digital video signal to a digital mirror device.

13. The method of claim 1 wherein each frame includes a number of pixels equal to about half of the product of the number of lines by the number of pixels per line in the digital video signal.

* * * * *